United States Patent [19]

Lustig et al.

[11] 4,131,137
[45] Dec. 26, 1978

[54] COMPOSITE TUBULAR CASING FOR PROCESSED FOODS AND METHOD OF FABRICATING THE CASING

[75] Inventors: Stanley Lustig, Park Forest; Ganapathy Vasudevan, Bolingbrook, both of Ill.

[73] Assignee: Union Carbide Corporation, New York, N.Y.

[21] Appl. No.: 753,818

[22] Filed: Dec. 23, 1976

[51] Int. Cl.² .............................................. F16L 11/04
[52] U.S. Cl. ................................... 138/118.1; 138/119; 138/137
[58] Field of Search ................... 138/118.1, 118, 119, 138/DIG. 7, 137; 229/93, DIG. 12; 426/105, 125, 135

[56] References Cited

U.S. PATENT DOCUMENTS

| 2,686,744 | 8/1954 | Cornwell | 138/DIG. 7 |
| 2,742,388 | 4/1956 | Russell | 138/111 |
| 2,766,164 | 10/1956 | Salem | 138/DIG. 7 |
| 3,131,069 | 4/1964 | Galler et al. | 426/105 |
| 3,369,911 | 2/1968 | Wilhelm | 138/118.1 |
| 3,640,735 | 2/1972 | Oppenheimer et al. | 138/118.1 |

Primary Examiner—Richard E. Aegerter
Assistant Examiner—James E. Bryant, III
Attorney, Agent, or Firm—Eugene Lieberstein

[57] ABSTRACT

A composite tubular food casing comprising a substantially flattened tubular substrate of cellulosic material and a melt extruded layer of thermoplastic material bonded to the tubular substrate with a beaded seam formed in the thermoplastic material adjacent the flattened edges of the cellulosic layer and separated from each edge a predetermined distance of no greater than 0.003 inches.

5 Claims, 6 Drawing Figures

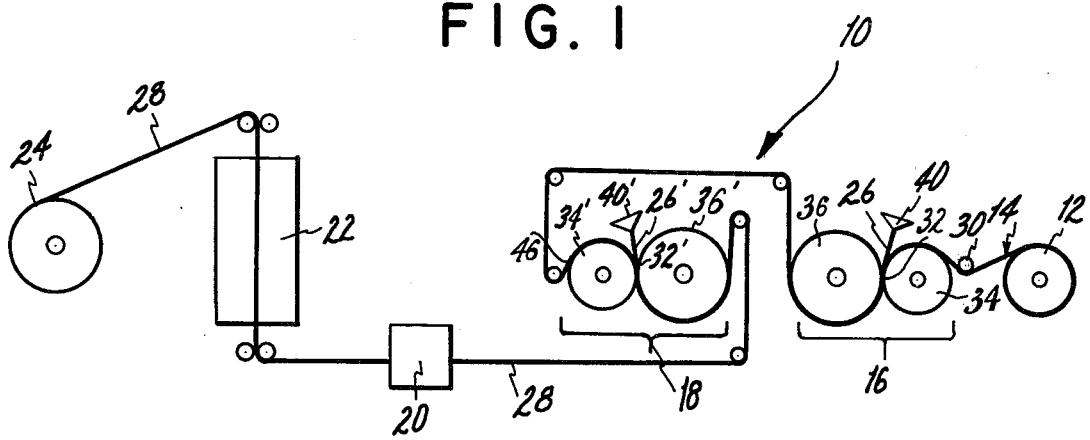
FIG. 1
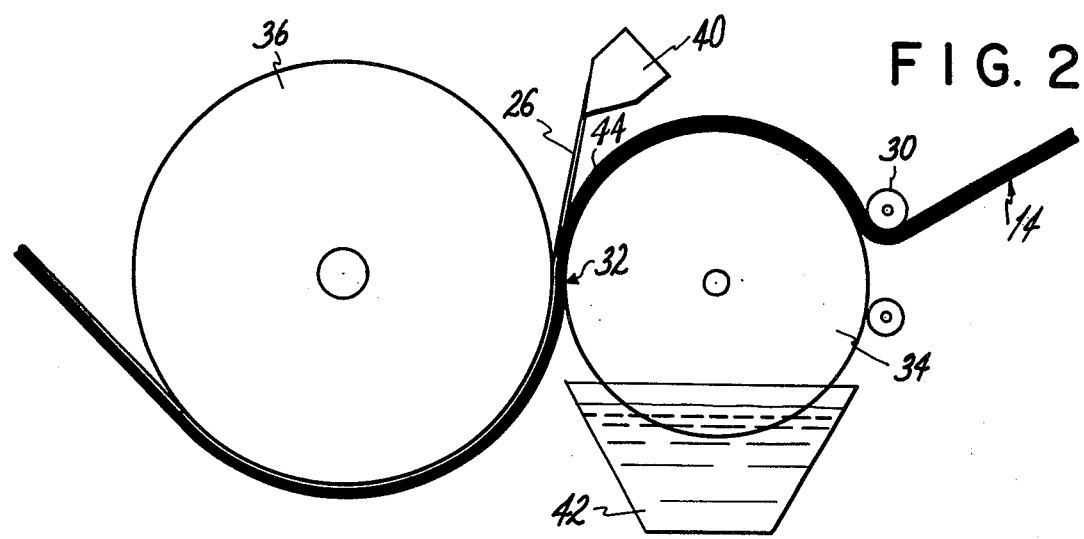
FIG. 2
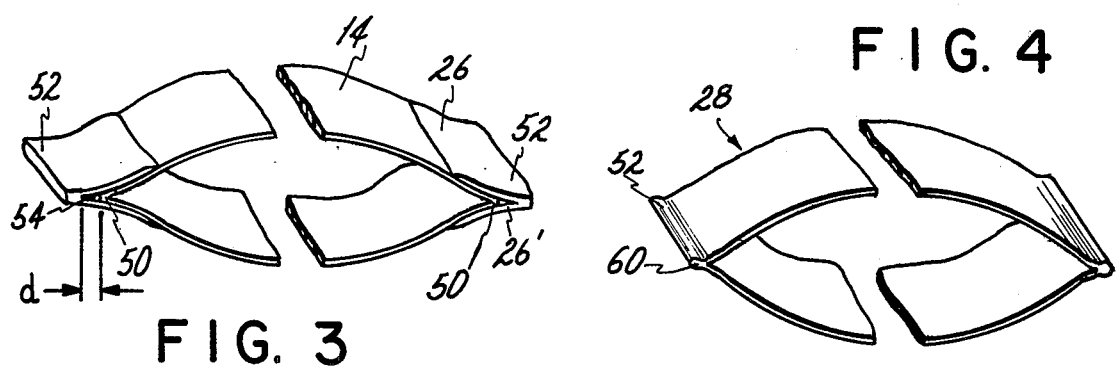
FIG. 3
FIG. 4

COMPOSITE TUBULAR CASING FOR PROCESSED FOODS AND METHOD OF FABRICATING THE CASING

SPECIFICATION

This invention relates to composite tubular food casings formed from at least two layers and to a method for forming a composite tubular food casing from a flattened tubular layer of cellulosic material.

Various kinds of emulsified food products, particularly meat products such as sausage, poultry and turkey roll, are processed within a protective casing. The protective casing used in the food processing industry is primarily that of a cellulosic base material which is either of the supported or unsupported type. The unsupported type is derived from natural regenerated cellulose whereas the supported type includes a fiber impregnated paper which functions as a reinforcing agent. One characteristic common to either type of cellulosic material is its permeability to water and air. This characteristic permits the stuffed food product to dry out within a relatively short time period and promotes spoilage. In addition, the casing itself may become wrinkled after a short shelf life leaving an unattractive product.

To overcome these disadvantages a resinous layer may be coated onto the cellulosic material to impart impermeability and other desirable characteristics to the casing relative to such properties as structural integrity, strength, resiliency, gloss and aesthetic appearance. The application of a resinous coating to a layer of cellulosic material should be compatible with existing fabricating techniques used in converting the cellulosic layer into a casing of conventional tubular geometry for use by the food processor.

For the foregoing reason, as well as economics, it is deemed preferable to coat the layer of cellulosic material after it has been converted into tubing. Heretofore, coatings have been applied to conventional cellulosic tubular layers by practicing known wet processing procedures such as, for example, dipping or spraying the desired resinous solution onto the surface of the tubular layer. The principal disadvantage of such procedures relate to their inability to control thickness and uniformity in the coating. A further problem relates to the inability to form a satisfactory bond between the coating and the cellulosic base material. The composite tubular casing should possess a peel strength sufficient to prevent separation of the layers during the processing of the food product or thereafter.

An alternative procedure, well known to the art, for depositing a layer of thermoplastic material over a cellulosic layer is that of melt extrusion. Although well known, this procedure has not, to date, been availed of because of the difficulty in forming a satisfactory coating over a tubular casing.

In accordance with the present invention it has been discovered that a composite tubular casing can be formed of high peel strength and with substantial control over the thickness of the thermoplastic layer by melt extruding the thermoplastic layer to a flattened cellulosic tubing and then forming a beaded seam judiciously located at the opposite edges of the resulting flattened casing. The beaded seam eliminates void pockets found to exist between the flattened tubing edges and the thermoplastic layer. A "beaded seam" is defined for purposes of the present specification and claims as a congealed mass of coalesced material formed in the thermoplastic material by the application of a flame or its equivalent as herein set forth in the specification. The beaded seam must be critically located proximate the longitudinal edge of the tubing. The bond formed between the thermoplastic layer and the cellulosic tubing is achieved through the application of a predetermined primer compatible with the method of the present invention.

Accordingly, it is an object of the present invention to provide a composite tubular food casing having a uniform outer coating of a thermoplastic material and an inner coating of cellulosic material bonded to the outer coating through a predetermined primer.

A further object of the present invention is to provide a method for forming a composite tubular food casing from a substantially flattened tubular layer of cellulosic material.

Other objects and advantages of the present invention will become apparent from the following description of the invention when read in connection with the accompanying drawings of which:

FIG. 1 is a schematic illustration of an exemplary system for carrying out the method of the present invention;

FIG. 2 is an enlarged illustration of one of the melt extrusion stations in FIG. 1;

FIG. 3 is an enlarged oblique representation of the tubular composite casing of FIG. 1 preceding the step of forming the beaded seams and with the seamed ends greatly magnified for purposes of illustrating the invention;

FIG. 4 is an enlarged oblique representation of the tubular composite casing of the present invention with the beaded seams greatly magnified for comparison with that of FIG. 3;

Figure 5:
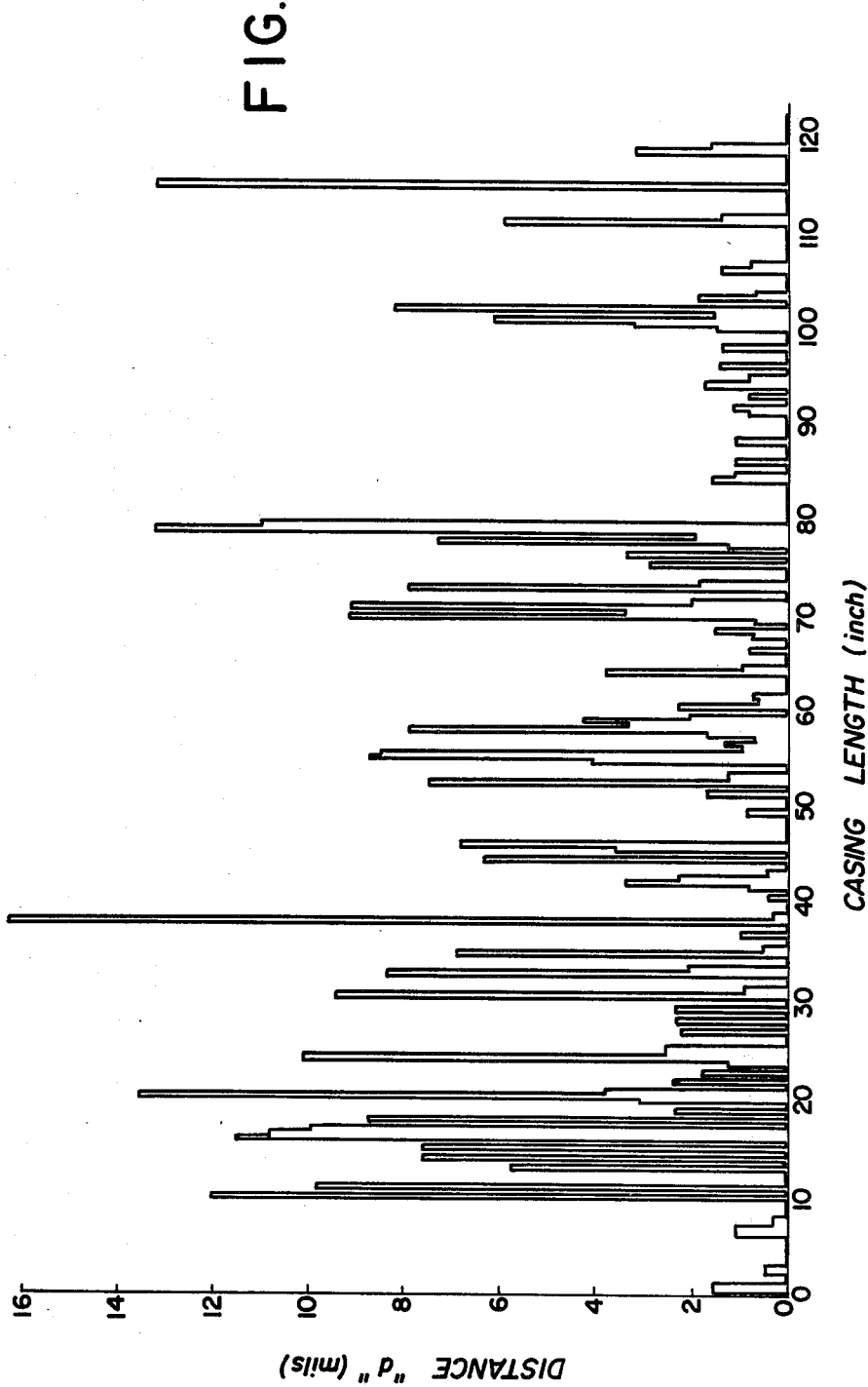
FIG. 5 is a graph of the average size of the void between the beaded seams and the longitudinal edges of the cellulosic tubular substrate; and, FIG. 6 is a graph of the average size of the void separating the unbeaded resinous coating and the edge of the cellulosic tubular substrate.

Referring now to the drawings, FIGS. 1 and 2 illustrate the extrusion coating system 10 of the present invention consisting, in general, of a supply reel 12 containing a supply of a flattened cellulosic tubular substrate 14 preferably with a coating of primer, a first melt extrusion coating station 16, a second melt extrusion coating station 18, a knife assembly 20, a heater stack 22, and a take-up reel 24.

The operation of applying a primer to the cellulosic tubular substrate is preferably carried out independent of the process of forming the composite casing of the present invention. A suitable primer material may be coated about the flattened cellulosic substrate 14 before winding it around the supply reel 12 by simply passing it through a solution of primer or spraying primer over the cellulosic tubing followed by drying the primed layer until it is dry and tack-free. Some moisture should be retained to maintain sufficient flexibility during bending of the casing. Thereafter the primed cellulosic tubular substrate 14 may, if desired, be stored for a considerable length of time before a layer of thermoplastic resin is extruded over the primed surface of the tubular substrate 14 following the procedure of the present invention. The primer promotes adhesion between the tubular cellulosic substrate 14 and the extruded thermoplastic layer. To represent a satisfactory primer the coating of thermoplastic resin must not separate from the cellulosic tubular substrate 14 even after immersion in boiling hot water for a duration of at least 5 minutes. An acceptable test for determining the degree of resistance to separation is to measure the peel strength of the thermoplastic resinous coating to the tubular cellulosic substrate 14. A minimum peel strength of at least 0.1 lbs/inch and preferably above 0.15 lbs/inch is necessary for a primer material to be considered satisfactory. One suitable procedure for measuring the peel strength of the composite tubular casing is to record the force required to separate the extruded layer from the tubing using a commercially available Instron Tensile testing machine. By preparing specimens of equal length from a sample of composite tubular casing and mounting each in the machine so that the thermoplastic coating is fastened to a movable clamp, for movement at a specified speed of 1 inch per minute relative to the tubular substrate 14, and with the tubular substrate 14 mounted to a stationary clamp the separating force may be readily recorded.

Primer materials which have been found in accordance with the present invention to satisfy the minimum peel strength requirement include the following compositions: polyhydroxylated alkoxy alkyl melamine complexes, triazine amine formaldehyde complexes, and the condensation product of a polyamide with epichlorohydrin or a polyamine-polyamide with epichlorohydrin.

The wound supply roll 12 containing the flattened tubular cellulosic substrate 14 with a surface primer, is unwound, preferably under tension, past the guide roll 30 through the nip 32 between the rollers 34 and 36 of the first melt extrusion station 16. The melt extrusion stations 16 and 18 are essentially identical to one another with the rollers 34' and 36' of the second extrusion station 18 corresponding to the rollers 34 and 36 of the first extrusion station 16 and with the melt extrusion die 40 of the first melt extrusion station 16 corresponding to the melt extrusion die 40' of the second melt extrusion station 18. The melt extrusion station 16 is shown enlarged in FIG. 2. The melt extrusion die 40 is preferably a conventional slot die from which a layer of extruded thermoplastic resinous film 26 is drawn at a relatively high melt temperature over the tubular substrate 14 at the nip 32 between the two rolls 34 and 36 respectively. Roll 36 is preferably a steel roll whereas roll 34 is an idler roll preferably of rubber. A regulated air cylinder (not shown) controls the squeeze pressure at the nip 32. The roll 34 is immersed in a bath of cold water 42 to maintain a low roll surface temperature. The coating rolls 34 and 36 may also be raised and lowered by means not shown. The slot die 40 is mounted above the rubber roller 34 such that the distance between the mouth of the die and the nip point 32 is at a minimum. This will ensure minimum heat loss of the melt layer 26 before contacting the tubular substrate 14 and will also allow the squeeze rolls to remove any air entrapped between the coated layer 26 and the tubular substrate 14. The guide roll 30 is positioned to ensure that at least one-third to one-half of the roll 34 is in contact with the substrate 14 which helps to maintain the tubular substrate 14 in a flattened condition as it passes around the roll 34 and to preserve the tension in the tubular substrate 14.

The first extrusion station 16 coats only one of the flattened sides 44 of the tubular substrate 14 with a layer of thermoplastic resin 26. The opposite side 46 of the flattened tubular substrate 14 is coated with an equivalent thermoplastic resin layer 26' at the extrusion station 18 in a similar manner under substantially identical operating conditions. The thickness of the thermoplastic resinous layer 26 and the corresponding layer 26' is controlled by the extrusion rate of each thermoplastic resin 26 and 26' and the speed of the rolls at the nip 32 and 32' respectively. Each layer of thermoplastic melt 26 and 26' respectively, must have a flat width which is wider than the width of the flattened tubular substrate 14. This is necessary to ensure an even and uniform distribution of melt layer over the tubular surface and to avoid difficulties in forming a seam around the tubular edges 50 as is shown in FIG. 3.

The extruded layers 26 and 26' extend over the longitudinal edges 50 of the flattened tubular substrate 14 and engage each other at the ends 52 in an overlapping relationship. The overlapping ends 52 immediately coalesce upon contact to form a longitudinal seam at each end 52. The width of each longitudinal seam 52 may be excessive and can be narrowed by removal of excess material. To the naked eye the longitudinal seam 52 appears contiguous to the longitudinal edge 50 such that upon narrowing of the width of each seam 52, a composite tubular casing 28 is formed with a thermoplastic layer completely surrounding the tubular substrate 14. Upon testing however, the composite casing 28 was deemed unsuitable for the packing and processing of food products for reasons which were traced to an accumulation of moisture at the area of each seam 52. This condition appears to be independent of the composition of the thermoplastic resin and/or the primer composition. It was thereafter observed by examination under a microscope at a magnification of 40× that the coalesced seam 52 was actually spaced a lineal distance "d" from the longitudinal edges 50. The displacement distance "d" upon measurement, as will be discussed hereafter, averaged a distance of about 7.5 mils along the length of the seam 52. Apparently this distance "d" is sufficient to form a void space 54 which contributes to water accumulation and coating delamination. It should be understood that FIG. 3 is but representative of the tubular substrate 14 after being coated upon each of its flattened sides with a thermoplastic resinous layer. The drawing is greatly exaggerated at the ends 52 in order to magnify the void space 54 so as to simplify the explanation for forming a beaded seam as will become hereafter apparent.

It has been discovered in accordance with the present invention that the displacement distance "d" can be decreased by an amount sufficient to reduce the void space 54 to an area which will no longer support water accumulation. This may be accomplished by forming a bead 60 along the thermoplastic seam 52. The bead may be formed by passing a flame under each longitudinal seam 52. The flame re-fuses the thermoplastic layers 26 and 26' along the seam 52 and, provided the flame is brought in close enough to the longitudinal edge 50, will propagate additional fusion between the thermoplastic layers in a transverse direction to an extent sufficient to decrease the distance "d." This same effect can be achieved without a flame by using, for example, a heated knife provided the edge of the knife in contact with the thermoplastic seam 52 is maintained at a temperature of at least about 1000° F. The beaded edge 60 is preferably formed after the seam 52 is trimmed. Alternatively the knife may be used to simultaneously trim excess seam material and to form the beaded edge 60.

Since hot knife mechanisms for cutting and sealing thermoplastic material are well known in the art it is considered unnecessary to show an assembly for holding the knife mechanism on each side of the flattened tubular casing 28. Accordingly, FIG. 1 illustrates the knife assembly 20 only schematically. It is also conventional to connect a source of electrical energy to the knife mechanism to raise the temperature to any suitable level. As earlier indicated it is necessary to raise the temperature of the knife to a level sufficient to simulate the effect of a flame. This will vary with the speed of operation and the thickness of the seam 52. However, a minimum of 1000° F. and preferably 1200° F. has been found necessary to produce the desired beaded edge. The cutting edge of the knife should also be fairly narrow, preferably about ⅛ inch or less, to control the cut.

After passing the knife assembly 20 the tubular casing 28 may, if desired, be heat treated to improve coating adhesion by passing it through a heater stack 22 which may, for example, consist of infrared heaters. Thereafter, the composite tubular casing 28 is wound around the take-up reel 24. The resulting composite tubular casing 28 has a thermoplastic coated layer on its outside surface. If desired, the casing can be turned inside out so that the thermoplastic coating is on the inside surface.

The thermoplastic coating is not limited to any specific material composition. Hence, the thermoplastic composition chosen will depend upon its suitability to melt extrusion techniques and upon the selection of the desired casing properties for the food product. Suitable material may be a polymer selected from the group consisting of polyolefins such as polyethylene, ethylene acrylic acid, and ethylene vinyl acetate and consisting of ionomers, polyamides, polyesters, acrylonitriles and vinyl polymers such as polyvinyl chloride, polyvinylidene chloride, and the copolymers of vinylidene chloride. As used herein, the term polymer includes homopolymers, copolymers, terpolymers, block copolymers and the like.

The following table shows the comparative performance between samples of tubular casings formed without a beaded seam and samples of equivalent tubular casing formed in accordance with the present invention. The thermoplastic coated layer for the first set of samples is polyethylene having a density of about 0.92 and a melt index of 5.7. For a second set of comparative samples an ionomer resin was selected having a melt index of 4.4 and a density of 0.93. The thickness of the thermoplastic layer in each case was two mils. The casings were all stuffed with poultry roll, cooked at 180° F. in water to an internal temperature of 160° F. for approximately 3 hours and then cooled before storage. The samples were thereafter visually inspected and recorded as indicated in Table I.

TABLE I

| Sample No. | Coating | Beaded vs. unbeaded seam | Observations after processing |
|---|---|---|---|
| 1 | Polyethylene | Unbeaded | Water pockets along both seams. Coating split on one side. |
| 2 | " | " | " |
| 3 | " | " | Small water pockets on both seams. |
| 4 | " | " | Small water pockets on one seam and coating split. |
| 5 | " | Beaded | O.K. |
| 6 | " | " | O.K. |
| 7 | " | " | O.K. |
| 8 | " | " | O.K. |

TABLE I-continued

| Sample No. | Coating | Beaded vs. unbeaded seam | Observations after processing |
|---|---|---|---|
| 9 | " | " | O.K. |
| 10 | Ionomer resin | Unbeaded | Small split on one seam. |
| 11 | " | " | Split on one side and water pocket on the second side. |
| 12 | " | " | Water pockets on both seams. |
| 13 | " | " | " |
| 14 | " | Beaded | O.K. |
| 15 | " | " | O.K. |
| 16 | " | " | O.K. |
| 17 | " | " | Small pocket on one seam. |

Figure 6:
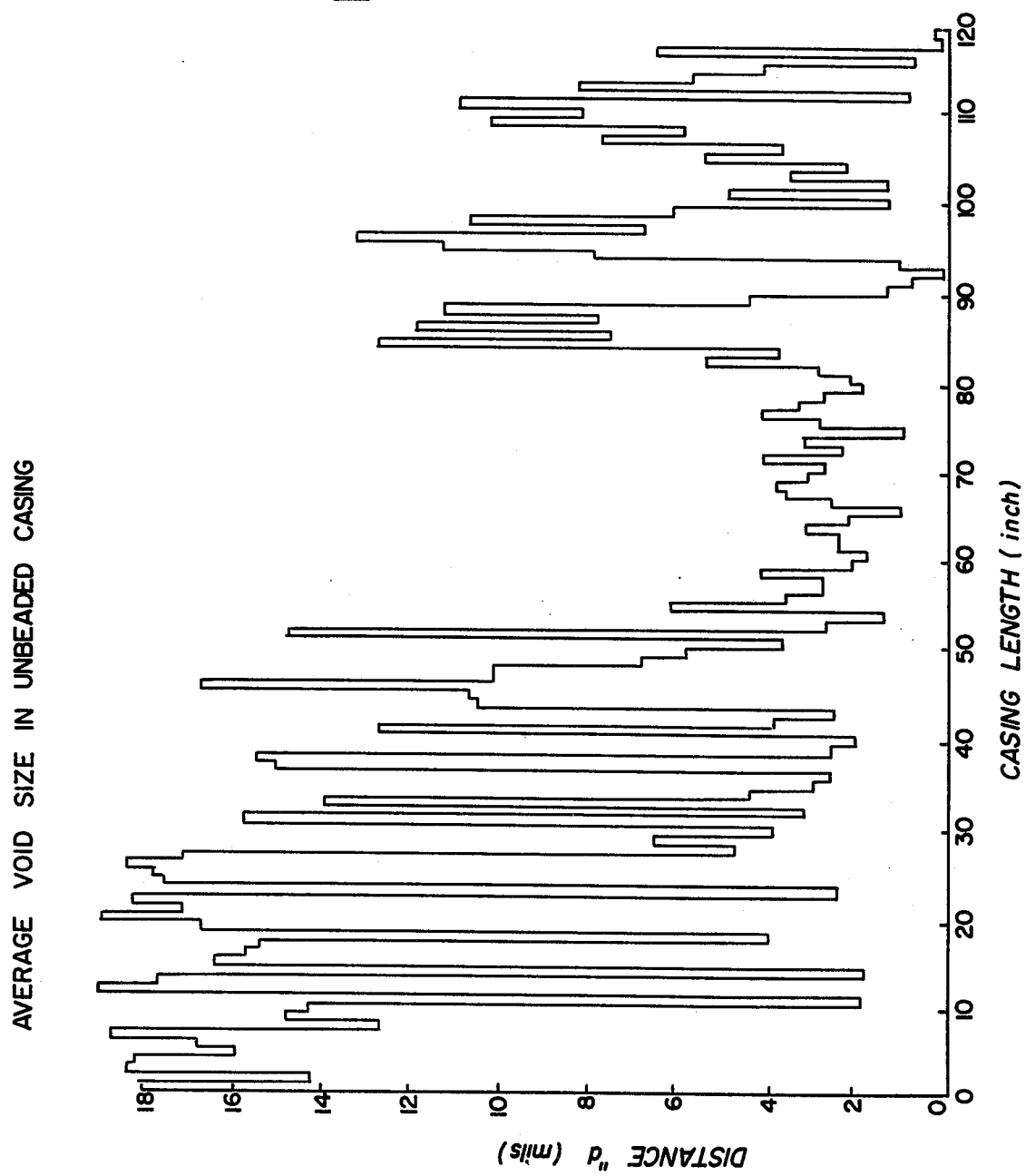

Following the examination by visual inspection as indicated in the above Table I, the average displacement distance "d" was measured by examination under a microscope at a magnification of 40×. The average distance "d" for the unbeaded seam was 7.5 mils whereas the average distance "d" for the beaded seam was 1.5 mils. The calculation of the distance "d" was determined by taking a statistical number of equal length segments of the polyethylene coated sample casing used in Table I, representing, in total, a predetermined longitudinal length of casing arbitrarily selected to be 120 inches, i.e., 10 feet. The distance "d" for each segment was measured under the microscope at a uniform magnification of 40×. FIGS. 5 and 6 represent a graphical presentation of the results of the measurement of each distance "d" for each sample over the full sample length. The distance "d" is a lineal measurement which is intended to represent the void size or space between the edge of the cellulosic layer and the seam in the thermoplastic layer. Although the distance "d" for the individual segments, as is shown in FIGS. 5 and 6 respectively, vary relatively substantially, indicating the difficulty in realizing a zero void over the full length of the casing, the average of the measurements represent an approximate integration from which it was established that an average displacement distance of 7.5 mils or greater will support water accumulation whereas a 1.5 mil average or smaller will not support water accumulation and is equivalent in performance to a zero void. However, because of the difficulty in making an accurate correlation between the displacement distance "d" and what is deemed to be an acceptable void for minimizing or eliminating water accumulation the minimum average distance of 3 mils is hereby deemed to represent the outer acceptable distance with 1.5 mils being preferred. The position of the knife assembly 20 must accordingly be adjusted and maintained relative to the passing tubular casing 28 to assure an average separation distance "d" between the newly formed beaded seam 52 and the edge of the tubing 50 of no more than 3 mils (0.003 inches) and preferably less than 1.5 mils (0.0015 inches). A seam fabricated to provide a displacement distance "d" not greater than an average of about 3 mils is thus considered to be a seam substantially eliminating void space.

What is claimed is:

1. A laminated composite tubular casing for covering a food product adapted to be inserted therein and processed in situ, said composite food casing comprising:
   a first substantially flattened tubular layer of a cellulosic material forming two sides bounded by two longitudinal edges;

a second substantially flattened tubular layer of a thermoplastic material forming two sides bounded by two longitudinal edges, said first tubular layer being enclosed within said second tubular layer with the longitudinal edges of said second layer being spaced apart from the longitudinal edges of said first layer and with each side of said second layer being bonded to the side of said first layer adjacent thereto; and a beaded seam formed in said second layer extending the longitudinal length thereof proximate each edge and having a thickness greater than the thickness of said second layer and lying parallel to and separated from each longitudinal edge of said first layer by a predetermined lineal distance which averages above zero but no greater than about 0.003 inches over the longitudinal length of the casing.

2. A composite tubular food casing as defined in claim 1 wherein said composite casing is inverted such that said second tubular layer of thermoplastic material forms the inside surface of said casing and said first tubular layer of cellulosic forms the outside surface.

3. A composite tubular food casing as defined in claim 1 wherein said second layer is melt extruded over said first layer on said opposite sides thereof.

4. A composite tubular casing as defined in claim 1 wherein said thermoplastic material comprises a polymer selected from the group consisting of polyolefins, ionomers, polyamides, polyesters, acrylonitriles and vinyl polymers.

5. A composite tubular casing as defined in claim 4 wherein said thermoplastic material is bonded to said tubular layer through a primer material selected from the group consisting of a polyhydroxylated alkoxy alkyl melamine complex, a triazine amine formaldehyde complex, the condensation product of a polyamide with epichlorohydrin, and the condensation product of a polyamine-polyamide with epichlorohydrin.

* * * * *